United States Patent [19]
Girault

[11] 3,754,175
[45] Aug. 21, 1973

[54] SPEED CONTROL SYSTEM FOR HALL EFFECT MOTORS

[75] Inventor: Jean Girault, Paris, France
[73] Assignee: Thomson-CSF, Paris, France
[22] Filed: Feb. 3, 1970
[21] Appl. No.: 8,317

[30] Foreign Application Priority Data
Feb. 11, 1969 France .................. 6903146

[52] U.S. Cl. .................. 318/138, 318/327
[51] Int. Cl. .................. H02p 5/16
[58] Field of Search .................. 318/317, 318, 327, 318/341, 138

[56] References Cited
UNITED STATES PATENTS

| | | | |
|---|---|---|---|
| 3,400,317 | 9/1968 | Thomas | 318/318 |
| 2,886,757 | 5/1959 | Johnson | 318/318 |
| 3,234,447 | 2/1966 | Sauber | 318/327 |
| 3,395,326 | 7/1968 | Hebb | 318/318 |
| 3,440,506 | 4/1969 | Krestel | 318/327 |

Primary Examiner—Bernard A. Gilheany
Assistant Examiner—Thomas Langer
Attorney—Kurt Kelman

[57] ABSTRACT

In a Hall effect motor whose windings are supplied with squarewave signals whose phases are determined by the Hall generators of a resolver element, a comparator circuit receives a first signal in phase with one of those squarewave signals, the frequency of this first signal being representative of the speed of the motor. The power supply circuit supplying the windings is adjusted to supply the necessary power for the maximum speed which can or may be required from the motor. When the aforesaid frequency exceeds a threshold frequency, which is a function of a reference signal also supplied to the comparator circuit, the latter causes the temporary interruption of the supply to the windings.

7 Claims, 7 Drawing Figures

Patented Aug. 21, 1973

INVENTOR
JEAN GIRAULT
BY [signature]
AGENT

SPEED CONTROL SYSTEM FOR HALL EFFECT MOTORS

The present invention relates to high-efficiency speed control systems for Hall effect motors whose windings are supplied with rectangular waveform signals.

Regulation of the speed of motors of this kind is generally effected by using the back e.m.f. induced in the motor windings; this voltage, which is proportional to the rotor speed, is controlled to a setpoint value, the influencing of the motor speed being obtained through varying the control current supplied to the Hall generators. The drawbacks of this kind of solution are as follows:

the accuracy of regulation of the speed is limited by the variation, in time and as a function of temperature, of the co-efficient linking the rotor speed with the induced back e.m.f.;

proper control and proper efficiency in the control circuits can only be obtained within a narrow speed range by reason of the linear control function used.

It is an object of the invention to overcome these deficiencies and to obtain speed control which, if required, can be extremely accurate, this within a wide speed range and with very high efficiency.

According to the invention, there is provided a speed control system for a Hall effect motor, said motor comprising a resolver element provided with Hall generators having respective outputs, a motor element provided with windings respectively associated with said Hall generators, said windings having respective first and second terminals, and feeding circuits respectively associated with said windings and said Hall generators for supplying to their associated windings rectangular waveform signals whose phases are respectively determined by the output signals of their associated Hall generators, said speed-control system comprising:

i. a comparator circuit having a first input for receiving a first signal, a second input for receiving a reference signal, and an output for delivering a third signal which is a function of the frequency of said first signal, said comparator circuit having its first input coupled to one of said feeding circuits for receiving therefrom a signal whose frequency is a function of the speed of said motor and ii. switching devices, respectively associated with said feeding circuits and controlled by said comparator circuit for cutting the supply to said windings when the frequency of said first signal exceeds a threshold frequency which is a function of said reference signal.

The invention will be better understood, and other of its features rendered apparent, from a consideration of the ensuing description and the appended drawings in which:

FIG. 1 schematically illustrates a Hall effect motor of the aforementioned type;

Figure 5:
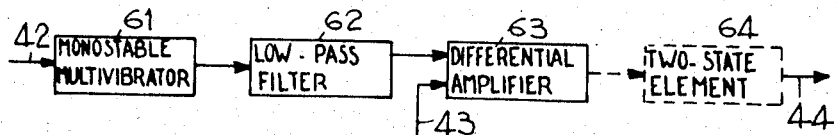
Figure 6:
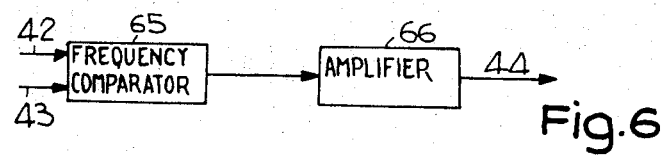
Figure 7:
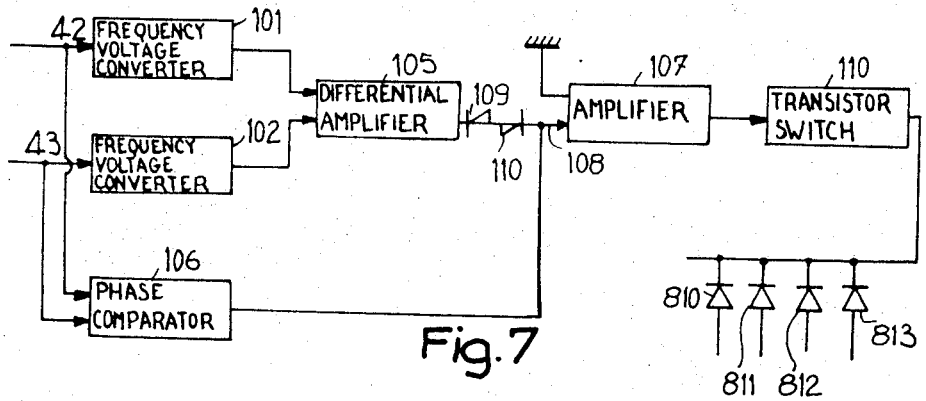

FIGS. 5 and 6 respectively illustrate two embodiments of the comparator circuit;

FIG. 7 is a diagram of a speed control system in accordance with the invention, coupled to a system for controlling the phase of rotation of the motor element.

Figure 1:
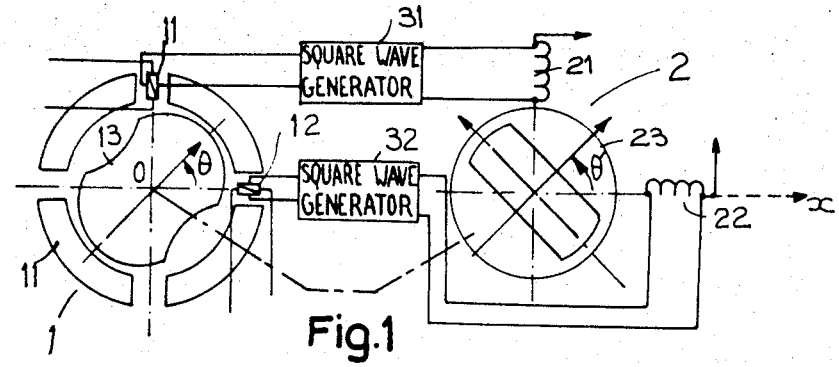

FIG. 1 illustrates by way of a non-limitative example a two-pole motor of the kind hereinbefore described. This motor comprises:

a Hall effect resolver, 1, the rotor of which is a permanent magnet 13 and the stator of which comprises two Hall generators 11 and 12 located in two stator slots which are offset through an angle of 90° in relation to one another;

An element 2 which is the motor element proper and the rotor of which is a two-pole permanent magnet 23, the stator comprising two windings 21 and 22, offset through 90° in relation to one another, respectively supplied by two feeding circuits 31 and 32, formed by two rectangular waveform signal generators respectively synchronized by the Hall generators 11 and 12. These windings are located in such fashion that if they received the output voltages from the Hall generators 11 and 12, they would create in the motor element a flux orientated in the same direction as the axis of the magnet 13 of the resolver.

Taking as the general direction of origin of the angles, that of the straight half-line located in the plane of the Figure and in the plane of symmetry (perpendicular to the axis of rotation of the resolver) of the Hall generator 12, the output voltages from the Hall generators 11 and 12 will be respectively $k \sin \theta$ and $k \cos \theta$, where $k$ is a constant if, as will be assumed, the inputs of the generators 11 and 12 are supplied with d.c. from a d.c. source, and $\theta$ the angle between the magnet axis and the above mentioned direction of origin of the angles.

The rectangular waveform signal generators 31 and 32 are synchronized by the Hall generators 11 and 12 so as to respectively produce currents of the form $$\epsilon_1 K$$

$$\epsilon_2 K$$

where K is a constant and where $\epsilon_1$ and $\epsilon_2$ have an absolute value equal to 1 and signs which are respectively those of $\sin \theta$ and $\cos \theta$.

The magnets 13 and 23 are coupled together, mechanically or otherwise, in such fashion that the angle between their respective axes is 90°.

If $\theta'$ designates the angle which represents the direction of the field induced in the motor element 2, and $\theta'' = \theta + 90$ the angle which defines the direction of the axis of the magnet 23, then it will readily be seen that for:

$0 < \theta'' < 90°$  $\theta' = -45°$
$90° < \theta'' < 180°$  $\theta' = 45°$
$180° < \theta'' < 270°$  $\theta' = 135°$
$270° < \theta'' < 360°$  $\theta' = 225°$ In these circumstances, the axis of the motor magnet and the induced field are always offset from one another through an angle of constant sign, comprised between 45° and 135°, this meaning that the motor torque likewise retains a constant sign.

Figure 2:
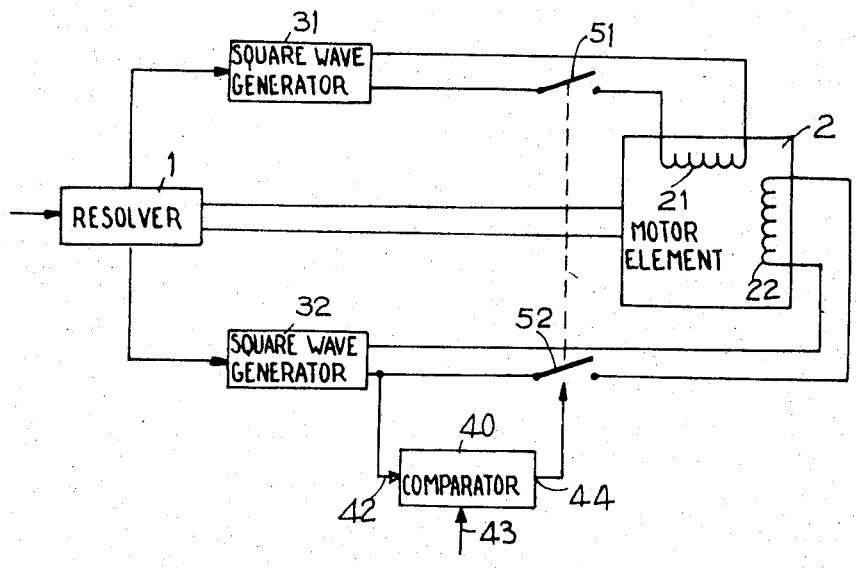
FIG. 2 is the fundamental diagram of a control system in accordance with the invention.

The speed control system in accordance with the invention is illustrated in FIG. 2. Once again, the elements 1, 2, 21, 22, 31 and 32 of FIG. 1 have been illustrated in a highly schematic manner.

It will be assumed that the rectangular waveform signal generators 31 and 32 are so adjusted as to supply to the motor element 2 the power which corresponds to the maximum speed which can be obtained or required from the motor.

A comparator circuit 40 has an input 42 connected to the output (or to an auxiliary output) of the generator 32, and to an input 43 which receives the reference signal.

This circuit thus receives, at 42, a squarewave signal the frequency of which in c/s is equal to the speed, in revolutions per second, of the motor. The reference signal applied to its input 43 is a function of the desired speed and defines a threshold frequency.

The comparator 40 supplies at its output a signal which, when the frequency of the squarewave signal exceeds the threshold frequency, operates a switching system schematically indicated in the Figure by the switches 51 and 52 cutting off the supply to the coils 21 and 22.

The difference between the motor speed for which the supply is cut off and the motor speed for which the supply is restored can be made very small if appropriate amplification is used.

The assembly of these two elements constitutes a speed control of the "all or nothing" kind ; the efficiency of the device is particularly good since the speed control is effected by suppressing the motor supply; the power dissipated by the switching system can be very small since the latter are constituted for example by switching transistors.

Figure 3:
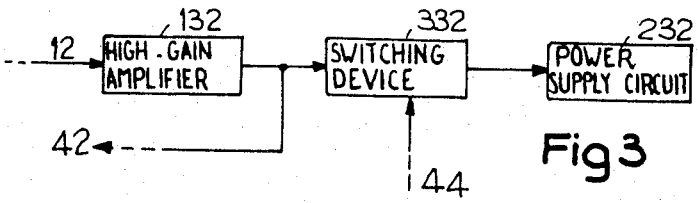
FIG. 3 illustrates a practical embodiment of the switching circuit in the control system.

FIG. 3 illustrates a preferred embodiment of the switching device.

It will be assumed that each of the squarewave signal generators 31 and 32 is formed in the conventional way by a high-gain amplifier which transforms the sinusoidal input signal supplied to it by the Hall generator associated with it, into trapezoidal waveform signals, this amplifier being followed by a power supply circuit controlled by the polarities or polarity changes in these trapezoidal signals and producing the requisite power for supplies to the windings.

In the Figure, only the generator 32 formed by the amplifier 132 and the power supply circuit 232, has been shown. Between these two elements, a switching device 332 is arranged which is controlled by the signal coming from the output 44 of the comparator circuit 40. This arrangement makes it possible to effect open-circuiting at limited power. But the signal representative of speed has of course to be tapped off up-circuit of the switching device, and this signal is therefore taken from the output of the amplifier 132. The generator 31 is of course designed in an identical manner.

Figure 4:
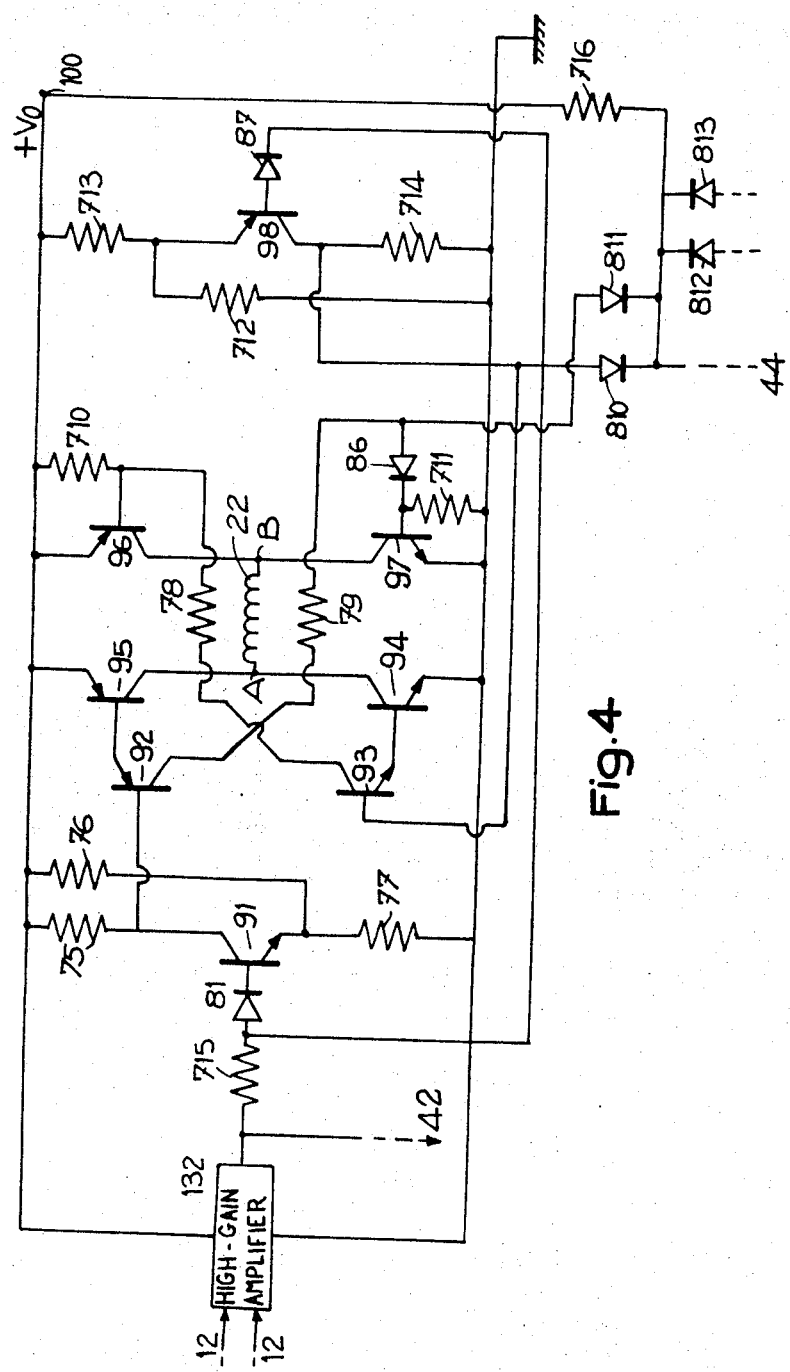
FIG. 4 is the detailed circuit of a preferred embodiment of the circuit shown in FIG. 3.

FIG. 4 illustrates a device for supplying the windings of the motor element, in which the switching devices 331 and 332 are respectively combined with the power supply circuits 231 and 232. Only the supply channel for the winding 22 has been shown.

The high-gain amplifier 132 is a differential amplifier the two inputs of which are respectively connected to the two output terminals of the Hall generator 12.

Its output supplies the input 42 of the comparator circuit 40. On the other hand, it supplies the combined arrangement 332-232 which will now be described :

The feeding circuit is of a conventional type, employing a bridge circuit.

The terminal A of the winding 22 is connected to the collectors of two transistors 95 and 94, respectively of p-n-p and n-p-n type ; its terminal B is connected to the collectors of two transistors 96 and 97 respectively of p-n-p and n-p-n type.

The emitters of the transistors 95 and 96 are connected to the positive terminal 100 of a d.c. source $V_o$, those of the transistors 94 and 97 are grounded, the second terminal of said source likewise being grounded.

The base of the transistors 96 and 97 are connected, respectively, to the terminal 100 across a resistor 710, and to ground across a resistor 711.

In this fashion, two channels for the supplying of the winding 22 are defined, one from A to B across the saturated transistors 95 and 97, the transistors 94 and 96 being then blocked, and the other from B to A across the saturated transistors 96 and 94, the transistors 95 and 97 being then blocked.

A p-n-p transistor 92 controls the state of the transistors 95 and 97 to the bases of which its emitter and its collector are respectively coupled, the connection, as concerns the collector, being across a resistor 79 and a diode 86, the cathode of which is connected to the base of the transistor 97.

An n-p-n transistor 93 controls the state of the transistors 94 and 96 to the bases of which its emitter and, across a resistor 78, its collector are respectively connected.

The transistors 92 and 93 are themselves respectively controlled by an n-p-n transistor 91 and a p-n-p transistor 98, to the collectors of which their bases are respectively connected.

The emitters of the transistors 91 and 98 are respectively biased by means of two resistance bridges 76–77 and 713–712, connected between the terminal 100 and ground ; their collectors are respectively connected to the terminal 100 across a load resistor 75 and to ground across a load resistor 714.

The transistors 91 and 98 are themselves controlled by the amplifier 132 in the following way :

The amplifier 132 is so designed as to supply a signal close to $V_o$, for positive alternations of its input signal, and a signal close to ground potential for the negative alternations of this input signal. Its output is connected across a resistor 715 and, respectively through two diodes 81 and 87, connected in opposite directions, to the bases of the transistors 91 and 98.

As described hitherto, the circuit operates as follows :

During positive alternations of the output signal from the Hall generator, the transistor 98 is blocked ; this blocks the transistor 93 which in turn blocks the transistors 94 and 96.

The transistor 91 is saturated ; it saturates the transistor 92 which in turn saturates the transistors 95 and 97.

The current flows through the winding 22 from A to B.

During negative alternations of the output signal from the Hall generator 12, the process reverses, the blocked transistors becoming saturated and vice versa. The current flows through the winding from B to A.

The diodes 81 and 82 prevent the base-emitter junctions of the transistors 91 and 92 from operating in the reverse direction. The resistors 76, 77, 712 and 713 define thresholds which prevent simultaneous conduction on the part of the transistors 94, 95 or 96, 97, during polarity transitions in the output voltage from the amplifier 132.

It will be assumed that the comparator is so designed as to supply at its output 44 a signal close to $V_o$ when the speed of the motor is lower than the threshold speed, and a signal close to ground potential in the reverse case.

This output 44 is connected to the cathodes of two diodes 810 and 811 and, across a resistor 716, to the voltage source $V_o$.

The anode of the diode 810 is connected to the base of the transistor 93, that of the diode 811 to the base of the transistor 97, through the diode 86.

When the output 44 delivers a signal close to $V_o$, the diodes 810 and 811 are blocked and their connections have no effect upon the aforedescribed process. When it delivers a signal to ground potential, those diodes conduct : the transistor 93, irrespective of the output signal from the amplifier 132, is blocked by the connection of the anode of the diode 810 and, correspondingly, the transistors 94 and 96 are likewise blocked.

Likewise the transistor 97 is blocked via its base because of the connection of the anode of diode 811.

The supplying of the winding 21 is controlled by an identical circuit, only the diodes 812 and 813 (corresponding to the diodes 810 and 811 of the first circuit) of which have been shown.

FIG. 5 illustrates a first embodiment of the comparator 40, the reference signal being supplied in the form of a voltage.

The comparator comprises primarily a frequency-voltage converter, the input of which is the input 42 of the comparator. The converter is here formed by a monostable multivibrator 61 with a control input 42, followed by a low-pass filter 62. The output of the converter supplies the first input of a differential amplifier 63, the second input of which, which is the second input 43 of the comparator, receives the reference voltage. The output of the amplifier 63 can be the output of the comparator 40, or better still, as shown in dotted fashion in FIG. 5, can supply a two-state device 64, supplying two voltages $V_1$ or $V_2$ depending upon the sign of the output signal from the amplifier 63, the element 64 being constituted for example essentially by a transistor operating in the blocked or saturated condition.

The multivibrator 61, the period of which is less than the period of rotation corresponding to the maximum speed which may be required of the motor, supplies a positive pulse of constant width with each transistion to the positive on the part of the output voltage from the generator 32. The mean value of these pulses appears at the output of the low-pass network 62 ; it is proportional to the frequency of triggering of the monostable circuit and thus to the speed of rotation of the motor.

The reference signal may be supplied, for example by a potentiometer.

The stability of the control loop is ensured by appropriate choice of the time constant of the frequency-voltage converter namely, in the present example, by the choice of the cut-off frequency of the low-pass filter 62.

In cases where the speed of the motor is to be variable within a wide range, the frequency-voltage converter 61–62 of FIG. 5 may be formed by a shaper circuit for the rectangular waveform input signals, followed by a conventional linear converter, for example of the pulse frequency-meter type.

The stability of the control loop is then obtained by appropriate choice of the time constants of the frequency-meter. This solution makes is possible to obtain circuits of low cost, having an accuracy in the order of ± 1 percent.

Another structure, shown in FIG. 6, can be used where the reference is in the form of a frequency.

The frequency comparator 65, with inputs 42 and 43, is used to produce a voltage proportional to the difference between the frequency representing the motor speed and the reference frequency ; this voltage is then applied to an amplifier 66 with an output 44.

The accuracy obtainable with this arrangement can be very high and depends virtually exclusively upon the frequency stability of the reference signal.

FIG. 7 illustrates a speed controller associated with a phase control device for synchronizing the phase of the rotor position of the motor element, with the phase of a reference signal the frequency of which is equal to the desired speed, in revolutions per second, of rotation of the motor.

It is then appropriate to use a speed reference signal in the form of a rectangular waveform signal whose frequency and phase correspond respectively to the required speed and phase of rotation of the motor.

The inputs 42 and 43 of the comparator circuit 40 respectively supply two linear frequency-voltage converters 101 and 102, for example of the kind hereinbefore described. These converters supply two inputs of a differential amplifier 105. The inputs 42 and 43 supply, on the other hand, the two inputs of a phase comparator 106 of high output impedance, supplying a continuous signal which is a function of the phase-shift between the two input signals.

The output of the amplifier 105 and that of the phase comparator 106 are connected to the input 108 of a second differential amplifier 107, the second input of which is grounded, two Zener diodes 109 and 110 connected in opposite directions being inserted between the output of the amplifier 105 and the input 108.

The amplifier 107 controls the saturation and blocking of a transistor amplifier 110, the output of which is connected to the diodes 810 and 811, 812 and 813 of a device supplying the windings, a device for example such as that shown in FIG. 4.

Regulation is effected in the following fashion :

as long as the motor speed differs by more than 5 percent from the reference speed, the output voltage of the amplifier 105 is such that the Zener diodes 109 and 110 are conductive ; in these circumstances, the phase comparator which has a high output impedance, has no effect upon the potential applied to the input terminal 108 of the amplifier 107 and only the frequency comparator controls the motor speed:

if the motor speed differs by less thant 5% from the reference speed, the situation is reversed and the phase comparator is the only one to operate ; the time constant of the phase comparator is selected so that the system at all times operates in the phase pull-in range.

This device enables a very high degree of accuracy to be obtained ; the position of the motor rotor can easily be locked to the reference phase within only a few degrees.

Self-evidently, the invention is in not limited to the embodiment described and illustrated. In particular, it is easy to adapt the circuits described to the case of multipole motors of the kind indicated ; in this case, the frequency of the signal produced by the Hall generators is $n$ times the speed of rotation, in revolutions per second, of the motor, $n$ being the number of pairs of poles.

What is claimed, is :

1. A speed control system for a Hall effect motor, said motor comprising a resolver element provided with Hall generators having respective outputs, a motor element provided with windings respectively associated with said Hall generators, said windings having respective first and second terminals, and feeding circuits respectively associated with said windings and said Hall generators for supplying to their associated windings rectangular waveform signals whose phases are respectively determined by the output signals of their associated Hall generators, said speed-control system comprising :

i. a comparator circuit having a first input for receiving a first signal, a second input for receiving a reference signal, and an output for delivering a third signal which is a function of the frequency of said first signal, said comparator circuit having its first input coupled to the output of one of said Hall generators for receiving a signal whose frequency is a function of the speed of said motor and whose amplitude is independent of said speed, and ii. switching devices, respectively associated with said feeding circuits and controlled by said comparator circuit for cutting the supply to said windings when the frequency of said first signal exceeds a threshold frequency which is a function of said reference signal.

2. A control system as claimed in claim 1, wherein each of said feeding circuits comprises : a high-gain amplifier having an input connected to the output of the associated Hall generator and an output coupled to said first input of said comparator circuit ; a direct current voltage source having first and second terminals ; a first channel connecting the first terminal of the asosciated winding to the first terminal of said source and the second terminal of said associated winding to the second terminal of said source ; a second channel connecting said second terminal of said associated winding to the first terminal of said source and the first terminal of said associated winding to the second terminal of said source ; a two-state circuit controlled by the output of said amplifier for alternately (i) blocking said first channel and making said second channel conductive and (ii) vice-versa when the frequency of said first signal does not exceed said threshold frequency ; and wherein each switching device associated with a feeding circuit is an auxiliary control circuit for simultaneously blocking said two channels independently of the state of said two-state circuit when said frequency of said first signal exceeds said threshold frequency.

3. A control system as claimed in claim 1, wherein said comparator essentially comprises : a frequency-voltage converter having an input which is said first input of the comparator circuit and an output ; a voltage comparator having a first input connected to the output of said converter and a second input ; and means for applying to said second input of said voltage comparator said reference signal under the form of a reference voltage.

4. A control system as claimed in claim 1, wherein said comparator circuit comprises two frequency-voltage converters, having respective inputs which are said two inputs of the comparator circuit and respective outputs, and a differential amplifier, having two inputs which are respectively connected to the outputs of said two converters, and an output.

5. A control system as claimed in claim 1, wherein said comparator circuit comprises a terminal two-state element, in order to produce a signal of a first level or a second level, depending upon whether the frequency of said first signal exceeds or does not exceed said threshold frequency.

6. A speed control system for a Hall effect motor, said motor comprising a resolver element provided with Hall generators having respective outputs, a motor element provided with windings respectively associated with said Hall generators, said windings having respective first and second terminals, and feeding circuits respectively associated with said windings and said Hall generators for supplying to their associated windings rectangular waveform signals whose phases are respectively determined by the output signals of their associated Hall generators, said speed-control system comprising:

i. a comparator circuit having a first input for receiving a first signal, a second input for receiving a reference signal, and an output for delivering a third signal which is a function of the frequency of said first signal, said comparator circuit having its first input coupled to one of said Hall generators for receiving a signal whose frequency is a function of the speed of said motor and whose amplitude is independent of said speed, said comparator circuit comprising two frequency-voltage converters having respective inputs which are said two inputs of the comparator circuit and respective outputs, a differential amplifier having two inputs which are respectively connected to the outputs of said two converters, and an output, a phase comparator having two inputs respectively connected to said two inputs of said comparator circuit and an output, a further amplifier having an input connected both to said output of said differential amplifier and to said output of said phase comparator and an output, a two-state element controlled by said further amplifier, said two-state element having an output which is said output of said comparator circuit, and an auxiliary device for preventing said differential amplifier and said phase comparator from simultaneously affecting the voltage at said input of said further amplifier; and ii. switching devices, respectively associated with said feeding circuits and controlled by said comparator circuit for cutting the supply to said windings when the frequency of said first signal exceeds a threshold frequency which is a function of said reference signal.

7. A control system as claimed in claim 6, wherein said phase comparator has a high output impedance and wherein said auxiliary device is formed by two Zener diodes connected in opposite directions between said output of said differential amplifier and said input of said further amplifier.

* * * * *